US009322989B2

(12) United States Patent
Fini et al.

(10) Patent No.: US 9,322,989 B2
(45) Date of Patent: Apr. 26, 2016

(54) OPTICAL FIBER WITH DISTRIBUTED BEND COMPENSATED FILTERING

(71) Applicant: OFS Fitel, LLC, Norcross, GA (US)

(72) Inventors: John M. Fini, Metuchen, NJ (US); Jeffrey W. Nicholson, Warren, NJ (US)

(73) Assignee: OFS FITEL, LLC, Norcross, GA (US)

( * ) Notice: Subject to any disclaimer, the term of this patent is extended or adjusted under 35 U.S.C. 154(b) by 103 days.

(21) Appl. No.: 14/334,949

(22) Filed: Jul. 18, 2014

(65) Prior Publication Data

US 2015/0316716 A1   Nov. 5, 2015

Related U.S. Application Data

(63) Continuation-in-part of application No. PCT/US2012/069814, filed on Dec. 14, 2012.

(60) Provisional application No. 61/856,109, filed on Jul. 19, 2013.

(51) Int. Cl.
    *G02B 6/02*    (2006.01)
    *G02B 6/028*   (2006.01)
    *G02B 6/036*   (2006.01)

(52) U.S. Cl.
    CPC .......... *G02B 6/0288* (2013.01); *G02B 6/02009* (2013.01); *G02B 6/03627* (2013.01); *G02B 6/028* (2013.01); *G02B 6/0365* (2013.01); *G02B 6/03655* (2013.01)

(58) Field of Classification Search
    None
    See application file for complete search history.

(56) References Cited

U.S. PATENT DOCUMENTS 4,227,771 A * 10/1980 Nolan ................. C03B 37/0142
                                                   385/126
4,949,038 A *  8/1990 Birch .................... C03B 37/027
                                                   250/227.17

* cited by examiner

*Primary Examiner* — Ryan Lepisto
*Assistant Examiner* — Erin Chiem
(74) *Attorney, Agent, or Firm* — Lowenstein Sandler

(57) ABSTRACT

An optical fiber includes a core region having a longitudinal axis. At least a portion of the core region has a substantially helical shape about a helical axis. The longitudinal axis may be substantially tangential to a helical bend in the optical fiber. A cladding region surrounds the core region. The core region and cladding region may be configured to support and guide the propagation of signal light in a fundamental transverse mode in the core region in the direction of the longitudinal axis. The fiber has a bend-induced gradient in its equivalent index of refraction over the portion of the core region. The fiber has a bend-induced equivalent index of refraction. At least a portion of cladding region has a graded refractive index opposite that of the bend-induced gradient. The cladding region may be configured to have a substantially flat equivalent index in response to a helical bend of the optical fiber.

20 Claims, 15 Drawing Sheets

Fig. 2
(Prior art)
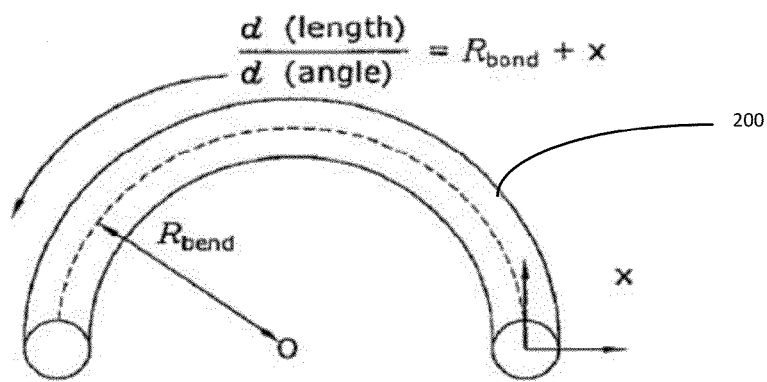
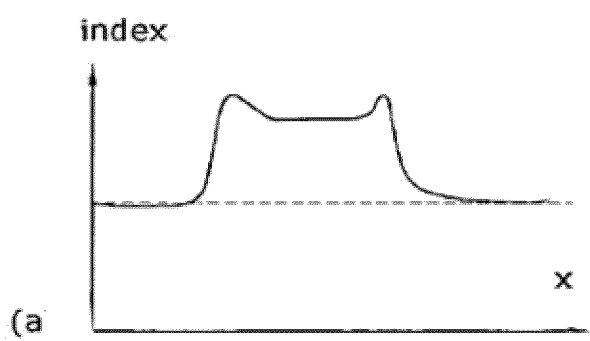
(a)
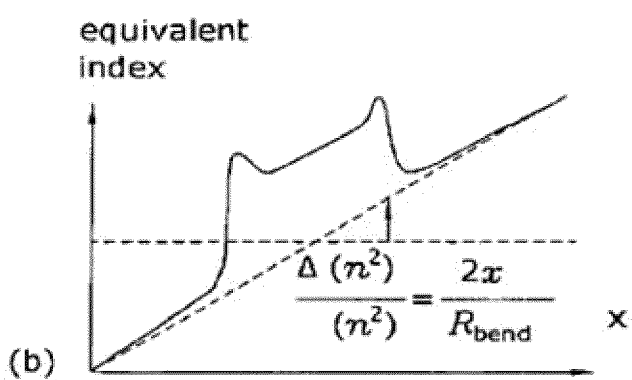
(b)
Fig. 3
(Prior art)

Fig. 15
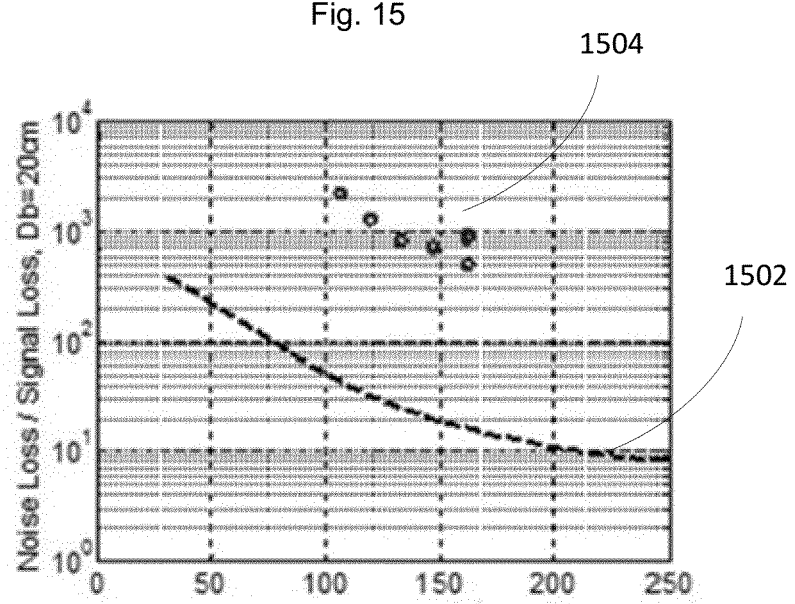
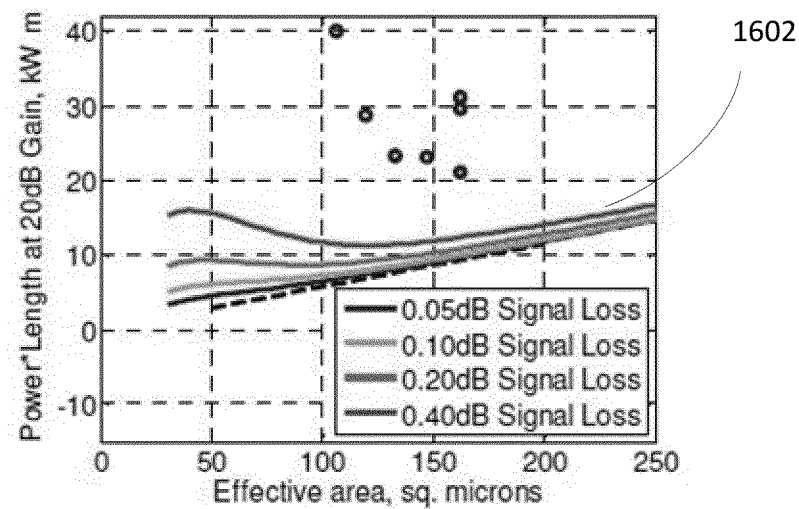
Fig. 16

OPTICAL FIBER WITH DISTRIBUTED BEND COMPENSATED FILTERING

CROSS-REFERENCE TO RELATED APPLICATIONS

This application claims the benefit of U.S. provisional patent application No. 61/856,109 filed Jul. 19, 2013, the disclosure of which is incorporated herein by reference in its entirety. This application is a continuation-in-part and claims the benefit of international Patent Cooperation Treaty patent application No. PCT/US12/69814 filed Dec. 14, 2012, which claims the benefit of U.S. provisional patent application No. 61/570,389 filed Dec. 14, 2011 and U.S. provisional patent application No. 61/570,403 filed Dec. 14, 2011, the disclosures of which are incorporated herein by reference in their entirety.

BACKGROUND OF THE INVENTION

1. Field of the Invention

The invention relates generally to optical fibers. More specifically, the invention relates to a large mode area fiber that is formed in the shape of a helix to cause the optical fiber to exhibit a refractive index profile that minimizes bend-induced limitations on the fiber's filtering properties.

2. Discussion of the Related Art

In many optical systems and more particularly, in the field of optical fiber-based technology, there is an increasing interest in the use of large mode area fibers in which it is desirable to filter or suppress certain wavelengths of light while guiding other wavelengths of light. An important example is the filtering of light generated by stimulated Raman scattering (SRS) in propagation along an optical fiber. Light generated by SRS can act as noise in some systems, but can also lead to damage of optical components and system failure, particularly in high-power systems.

Suppressing wavelengths associated with SRS has been demonstrated to significantly improve the performance of optical amplifiers and lasers. Some amplifiers may also require suppression of amplified spontaneous emission or spurious lasing at one wavelength (e.g. 1060 nm) in order to provide efficient amplification of a wavelength with competing or intrinsically lower gain (e.g. 940 nm). Similarly, significant benefits of wavelength filtering have been demonstrated in applications such as telecommunications, sensing, etc.

It is often desirable that a fiber have a large mode area while simultaneously providing high loss of undesirable wavelengths and low loss of the signal wavelength. Filter fibers have been demonstrated, but are subject to tradeoffs. In large mode area filter fibers, there is typically a tradeoff between degree of filtering, effective area, and bend loss, e.g., a required degree of filtering becomes more difficult to achieve as mode area increases. As mode area increases, it becomes more and more difficult to simultaneously achieve low signal loss (including macro-bend and micro-bend loss), high loss of undesirable wavelengths, high yield in fiber production, and reasonable insensitivity to how the fiber is bent or arranged. Other properties (beam quality, pump absorption, birefringence, etc.) may also play an important role in overall performance, and limit the degree of filtering.

It is often desirable to implement distributed filtering along the length of an optical fiber. In one particular application of interest, a delivery fiber is employed to direct light from a source to a utilization point. It is desirable that the delivery fiber guide high power (e.g. 1 or more kW), for example, to increase speed of material removal in a machining application. It is also desirable for the delivery fiber to direct light over relatively long distances (e.g. 5-50 m), to permit maximum flexibility in the position of the source and utilization point.

Filter fibers may attain selective filtering only when bent to a particular radius of curvature and arranged in a coil of approximately that radius. This strategy does not apply directly to a delivery fiber. Arranging the delivery fiber in a coil defeats the purpose of delivering light from source to a distant utilization point, since the distance between ends of the coiled fiber is much less than the fiber length.

BRIEF SUMMARY OF THE INVENTION

The above-described problems are addressed and a technical solution achieved in the art by providing an optical fiber that includes a core region having a longitudinal axis. At least a portion of the core region has a substantially helical shape about a helical axis. The longitudinal axis may be substantially tangential to a helical bend in the optical fiber. A cladding region surrounds the core region. The core region and cladding region may be configured to support and guide the propagation of signal light in a fundamental transverse mode in the core region in the direction of the longitudinal axis. The fiber has a bend-induced gradient in its equivalent index of refraction over the portion of the core region. This gradient in the cladding region has a strong influence on loss and filtering properties of the mode. The fiber has a bend-induced equivalent index of refraction. At least a portion of cladding region has a graded refractive index opposite that of the bend-induced gradient. The cladding region is configured to have a substantially flat equivalent index in response to a helical bend of the optical fiber.

In an example, the core region and cladding region of the helically-bent optical fiber may have a pitch to support and guide the propagation of signal light in the fundamental transverse mode over a distance that is substantially the length of the optical fiber. To this effect, the length of the portion of the core region may substantially match the length of a straight line projected by the portion of the core region onto the helical axis. Accordingly, the length of the portion of the core region may substantially match the distance traveled by light in the portion of the core region.

Since the optical fiber may have a helical shape, the core region may have a local radius of curvature that is substantially constant over substantially a total length of the core region. In another example, the core region may have a substantially constant radius of curvature over substantially the length of the optical fiber. The helical portion of the optical fiber (e.g., the core region) may be wound in a right-handed direction or left-handed direction about the helical axis.

In an example, the slope of the graded index of refraction (when the fiber is unbent) may be substantially negative. The graded index of refraction may be linear, that is, having a substantially constant slope. In an example, the slope of the graded index of refraction comprises a predetermined number of steps.

In one example, the cladding region comprises an inner cladding region and an outer cladding region and the optical fiber further comprises a trench region formed between the core region and the inner cladding region. The portion of cladding region having a graded index of refraction opposite the bend-induced gradient may extend over at least a portion of the inner cladding region. For a given mode of any fiber, the critical radius for bending is an important metric of filtering properties. By introducing a region having an index slope opposite that of the bend-induced gradient, the proposed strategy allows the critical radius to be determined by design. For example, the portion of cladding having a graded index of refraction opposite the bend-induced gradient can extend to the boundary dividing the inner cladding region and the outer cladding region. In such cases, the critical radius can also extend to this boundary. The optical fiber may be configured to guide the fundamental mode with substantially no loss at low wavelengths and to exhibit high loss at large wavelengths.

In one example, the outer cladding region and the trench region may have the same index of refraction. The material index of refraction of the fiber as a function of radial position in a pre-compensated portion of the inner cladding region may equal the mode effective index minus a compensation term.

In another example, the outer cladding region is formed from at least one glass tube or of undoped silica. The at least one glass tube may comprise commercially available tubing, such as Heraeus F300 glass, for example. The trench region may be formed of undoped silica or at least one glass tube.

In one example, the core region may include at least one dopant that increases its index above that of the cladding region. The at least one dopant may be at least one of germanium (Ge), aluminum (Al), or phosphorus (P). In another example, the core region may include at least one dopant that decreases the index, which may be fluorine (F) or boron (B). In another example, the core region may include at least one dopant that renders the optical fiber to be gain-producing, which may be a rare earth element or chromium (Cr).

A cross-section of the core region may be circular, annular, elliptical, polygonal, or other more complex shapes.

A method of manufacturing an optical fiber may be provided. A core region having a longitudinal axis may be formed. A cladding region may be formed surrounding the core region. At least a portion of an optical fiber may be bent to have a substantially helical shape about a helical axis. The longitudinal axis may be substantially tangential to a helical bend in the optical fiber. The core region and cladding region may be configured to support and guide the propagation of signal light in a fundamental transverse mode in the core region in the direction of the longitudinal axis. The fiber may have a bend-induced gradient in its equivalent index of refraction over the portion of the core region. At least a portion of cladding region may have a graded index of refraction opposite the bend-induced gradient of the mode.

In an example, the optical fiber may be manufactured to compensate the portion of the core region for manufacturing variations. Compensating for manufacturing variations may comprise at least one of providing a stress correction in the optical fiber, providing a layer of adjusted thickness in the optical fiber, providing an ultraviolet (UV)-induced index change in the optical fiber, or adjusting for statistical variations in a radius of curvature of the optical fiber.

In one embodiment, the optical fiber may be fabricated using an MVCD deposition method or a stacking method.

BRIEF DESCRIPTION OF THE DRAWINGS

The present invention may be more readily understood from the detailed description of an exemplary embodiment presented below considered in conjunction with the attached drawings and in which like reference numerals refer to similar elements.

FIG. 2 illustrates an exemplary section of a conventional large core diameter optical fiber that has been bent to exhibit a defined bend radius.

FIGS. 3A and 3B illustrate the impact of a bend on the refractive index of a conventional non-filtering fiber, with FIG. 3A showing the refractive index profile for a substantially "straight" section of fiber, and FIG. 3B showing the equivalent refractive index profile for a fiber as bent in FIG. 2.

FIG. 15 is a plot showing a performance tradeoff between mode area and filter selectivity.

FIG. 16 is a plot of power-length product at which the net Raman gain reaches 20 dB.

It is to be understood that the attached drawings are for purposes of illustrating the concepts of the invention and may not be to scale.

DETAILED DESCRIPTION OF THE INVENTION

Figure 1:
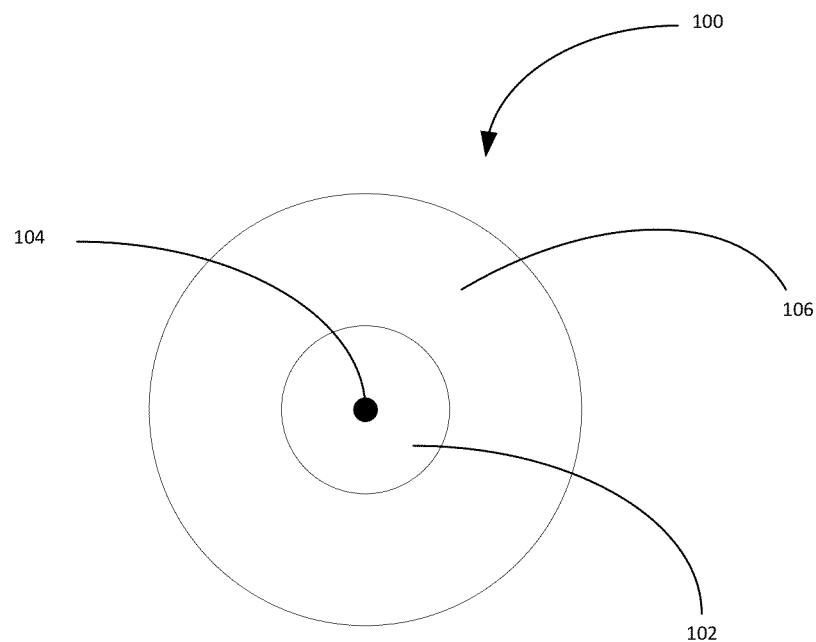
FIG. 1 is a schematic diagram of a graded-index core region of a large mode area filter fiber.

FIG. 1 is a schematic diagram of a core region 102 of a large mode area optical fiber 100. The fiber 100 may include the core region 102 having a longitudinal axis 104 and a cladding region 106 surrounding the core region. The core region 102 and cladding region 106 may be configured to support and guide the propagation of signal light in the core region 102 in the direction of the axis 104. To this end, the refractive index of the core region 102 ($n_{core}=n_c$) is greater than that of the cladding region 106 ($n_{clad}$). Preferably the core region 102 and the cladding region 106 are configured to propagate signal light preferentially in a fundamental transverse mode at the center wavelength of the signal light.

The term center wavelength of the signal light is intended to recognize the well-known phenomenon of line broadening; that is, no signal source emits light at precisely a single wavelength. Rather, all light sources emit at a center wavelength, where the intensity is typically maximum, as well as at lower intensities in a range of wavelengths extending on both sides of the center wavelength. This range is known as the linewidth. Hereinafter, signal wavelength is understood to refer to signal light that is inherently characterized by a non-zero linewidth.

The optical fiber 100 may be a standard, non-gain producing fiber used in a variety of applications including, for example, transmission systems, access systems, sensor apparatus, motor vehicles, and the like. Alternatively, the fiber 100 may be a gain-producing fiber, which finds application in, for example, fiber optic amplifiers and fiber optic lasers.

The core region 102 may be a single region, or it may be a composite of two or more different regions. The core region(s) may have a gradient in index of refraction and may have, for example, different dopants, different indices, and/or, in the case of a gain-producing filter fiber, different optical gains. The cladding region 106 may be a composite of two or more different regions. As with the core region, the cladding regions may have, for example, different dopants and/or different indices. Thus, the cladding region 106 may comprise an inner cladding region and one or more outer cladding regions (not shown) disposed radially outside of the inner cladding region. The outer cladding region may include, for example, a down-doped region (or trench), which has an index less than that of the inner cladding region. The index of the inner cladding region ($n_{clad}$) constitutes a frame of reference for the measurement of other index differences; to with, $\Delta n_c = n_{core} - n_{clad}$, which is often referred to as the contrast.

An optical fiber 100 may be made of silica and one or more suitable dopants in particular regions. For example, the core region 102 may include one or more dopants that increase its index above that of the cladding region 106, which may comprise substantially pure or undoped silica. Illustrative index-increasing dopants include germanium (Ge), aluminum (Al), and phosphorus (P). However, for reasons well known to those skilled in the art, the core region 102 may also include one or more index-decreasing dopants such as fluorine (F) or boron (B). Likewise certain portions of the inner cladding region may include one or more index-decreasing dopants to form trenches. Some regions may include both index-increasing and index-decreasing dopants.

If the optical fiber 100 is a gain-producing fiber, then the core region 102 may include at least one gain-producing dopant (e.g., a rare earth element or chromium (Cr)). The gain-producing dopant may be distributed throughout the entire core region 102, or it may be confined to only a portion thereof.

Although the use of the term radius in the foregoing discussion implies that the cross-sections of the core regions 102 are circular and/or annular, in practice, the core regions 102 may be non-circular; for example, the core regions 102 may be elliptical, polygonal, or other more complex shapes. Nevertheless, as is common in the art, the term radius may be employed for simplicity and clarity.

FIG. 2 illustrates a segment of optical fiber 200 that has been bent to exhibit a defined bend radius. As shown, bent fiber 200 is defined as having a bend radius $R_{bend}$, with the x-y orientation as shown. The bending of a fiber, as mentioned above, has been found to introduce changes in mode properties, including loss, filtering and effective area. In particular, the equivalent index model of the bent fiber 200 can be determined and then analyzed to account for the different path lengths "seen" by a propagating optical signal at different transverse positions x as it travels around the bend of radius $R_{bend}$ as follows:

$$\frac{d(\text{length})}{d(\text{angle})} = R_{bend} + x,$$

where path lengths are adjusted by defining the equivalent index profile $n_{eq}^2$, $$n_{eq}^2(x, y) = n^2(x, y)\left(1 + \frac{2x}{R_{bend}}\right),$$

which is considered to be a modified version of the nominal refractive index profile ($n^2$) of the optical fiber material. FIGS. 3A and 3B illustrates the impact of a bend on the refractive index of a conventional non-filtering fiber, with FIG. 3A showing the refractive index profile for a substantially "straight" section of fiber, and FIG. 3B showing the refractive index profile for a fiber as bent in FIG. 2. As shown, the equivalent refractive index is shifted upward along a slope defined by the following relation:

$$\Delta n = \frac{nx}{R_{bend}}.$$

The equivalent index model defined above leads to the conclusion that the effect of a bend in a fiber (particularly a large area fiber) can be likened to adding a constant index gradient to the profile of the fiber material itself (assuming low contrast). Related art fiber designs have concentrated on controlling the filtering properties subject to the limitation that the equivalent index profile has a slope in the cladding equal to the bend-induced gradient (i.e., that the cladding has constant material refractive index). This limitation imposes an important tradeoff between mode area, filter performance and bend loss.

In many high power applications, it is important to prevent detrimental nonlinear effects from occurring in the signal light. To this end, fibers with large mode area (LMA) are often used. A LMA fiber has a relatively large mode-field diameter (MFD) or a relatively large mode-field area ($A_{eff}$). Those skilled in the art will recognize that MFD and $A_{eff}$ are equivalent parameters only when the mode field shape is substantially Gaussian. However, when the mode-field shape departs from strictly Gaussian, then the MFD is generally not the best way to describe the size of the guided mode relevant to non-linearity. In this case, the industry relies instead upon $A_{eff}$, which is given by:

$$A_{\mathit{eff}} = \frac{\left(\int |E|^2 dA\right)^2}{\int |E|^4 dA}$$

where E is the transverse spatial envelope of the mode's electric field, and the integrations are understood to be performed over the cross-sectional area of the fiber. When the mode-field shape is close to an axisymmetric (i.e., symmetric about the longitudinal axis of rotation of the fiber) Gaussian function, the MFD is an appropriate metric for the diameter of the mode and may be expressed as:

$$MFD = 2\sqrt{\frac{2\int |E|^2 dA^2}{\int \left|\frac{dE}{dr}\right|^2 dA}}$$

where r is the radial coordinate. When the mode-field shape is exactly equal to an axisymmetric Gaussian function, then $A_{\mathit{eff}} = \pi \times MFD^2/4$.

Although LMA fibers advantageously reduce the effects of nonlinearities, they are disadvantageously more sensitive to bend distortion, which reduces the $A_{\mathit{eff}}$ and radially displaces and distorts the optical modes. Mode size can impact other important system aspects, such as splice loss.

Figure 4A:
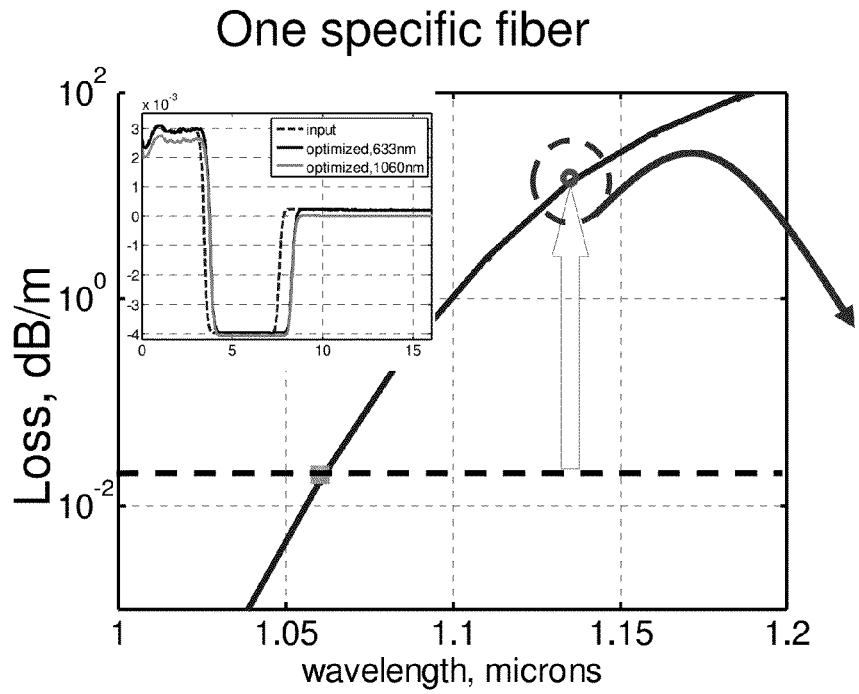
FIG. 4A graphically illustrates filtering loss versus wavelength for a single conventional filter fiber having an index profile.
Figure 4B:
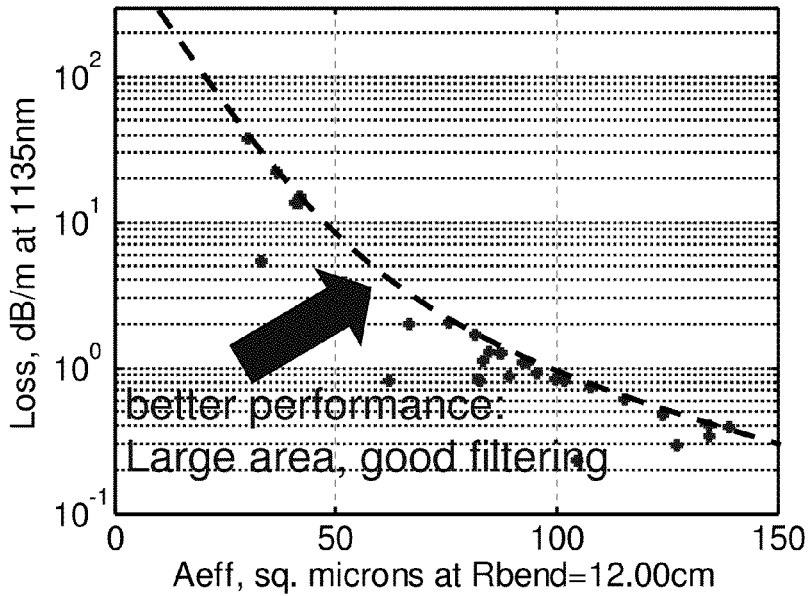
FIG. 4B is a plot of filtering loss versus effective area $A_{eff}$ of several conventional bent filter fibers, each having a bend radius of about 12 cm.

With conventional filter fibers, there is an inherent tradeoff between mode area and filter selectivity or sharpness. FIG. 4A graphically illustrates filtering loss versus wavelength for a single conventional filter fiber having an index profile shown in the inset (to be described in more detail below). FIG. 4B is a plot of filtering loss versus effective area $A_{\mathit{eff}}$ of several conventional bent filter fibers, each having a bend radius of about 12 cm. As shown in FIGS. 4A and 4B, there is a limit (as represented by the black dashed line) of how much filtering (or noise wavelength suppression) may be achieved. This limit decreases with effective area.

Figure 5A:
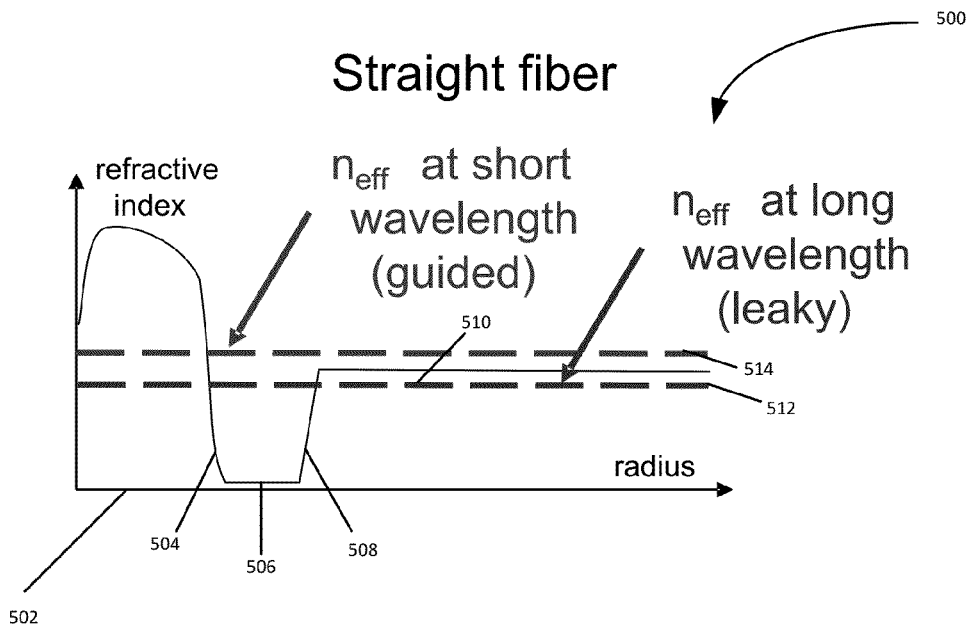
FIG. 5A is a refractive index profile of a conventional straight filter fiber.
Figure 5B:
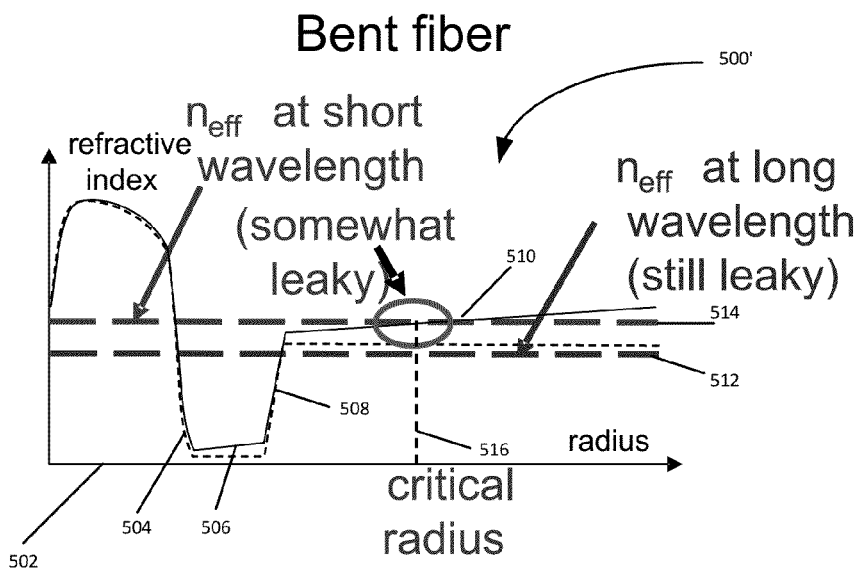
FIG. 5B is an equivalent refractive index profile of a conventional filter fiber when the filter fiber is bent.

FIG. 5A is a refractive index profile 500 of a conventional straight filter fiber. FIG. 5B is a refractive index profile 500' of a conventional filter fiber when the filter fiber is bent. In the straight fiber profile of FIG. 5A, the profile 500 typically exhibits a high index of refraction in a core region 502 near the fiber center, with a rapidly decreasing index in a region 504 that settles in a substantially low index of refraction region known as a trench 506, followed by a rapidly increasing index in the region 508 that plateaus in a cladding region 510.

Ideally, with no perturbations, the conventional filter fiber of FIG. 5A may rigorously guide a mode of a low wavelength of signal light with no loss, as illustrated by the dashed line 514 (i.e., depicting effective index of refraction $n_{\mathit{eff}}$ at short wavelengths). At the same time, as illustrated by the dashed line 512 (i.e., depicting effective index of refraction $n_{\mathit{eff}}$ at long wavelengths), the conventional filter fiber of FIG. 5A exhibits high loss at large wavelengths.

A conventional filter fiber, when subjected to bends as illustrated in FIG. 5B, becomes leaky, i.e., the filter fiber equivalent index profile 500' exhibits an "upward tilt" or bend-induced gradient with increasing radius, which is pronounced in the cladding region 510. At a critical bend radius 516 in the cladding region 510, as represented by the intersection of the dashed line 514 and the tilted profile 500', selectivity is reduced in that shorter wavelengths are no longer guided.

The tighter the bend, the closer the critical radius is to the center of the core region 502, such that selectivity is diminished for progressively lower wavelengths. This forces such designs to have smaller effective mode area than desired. Thus, ideal performance that a conventional filter fiber may achieve in principle is not achievable in a practical, coiled filter fiber.

Figure 6:
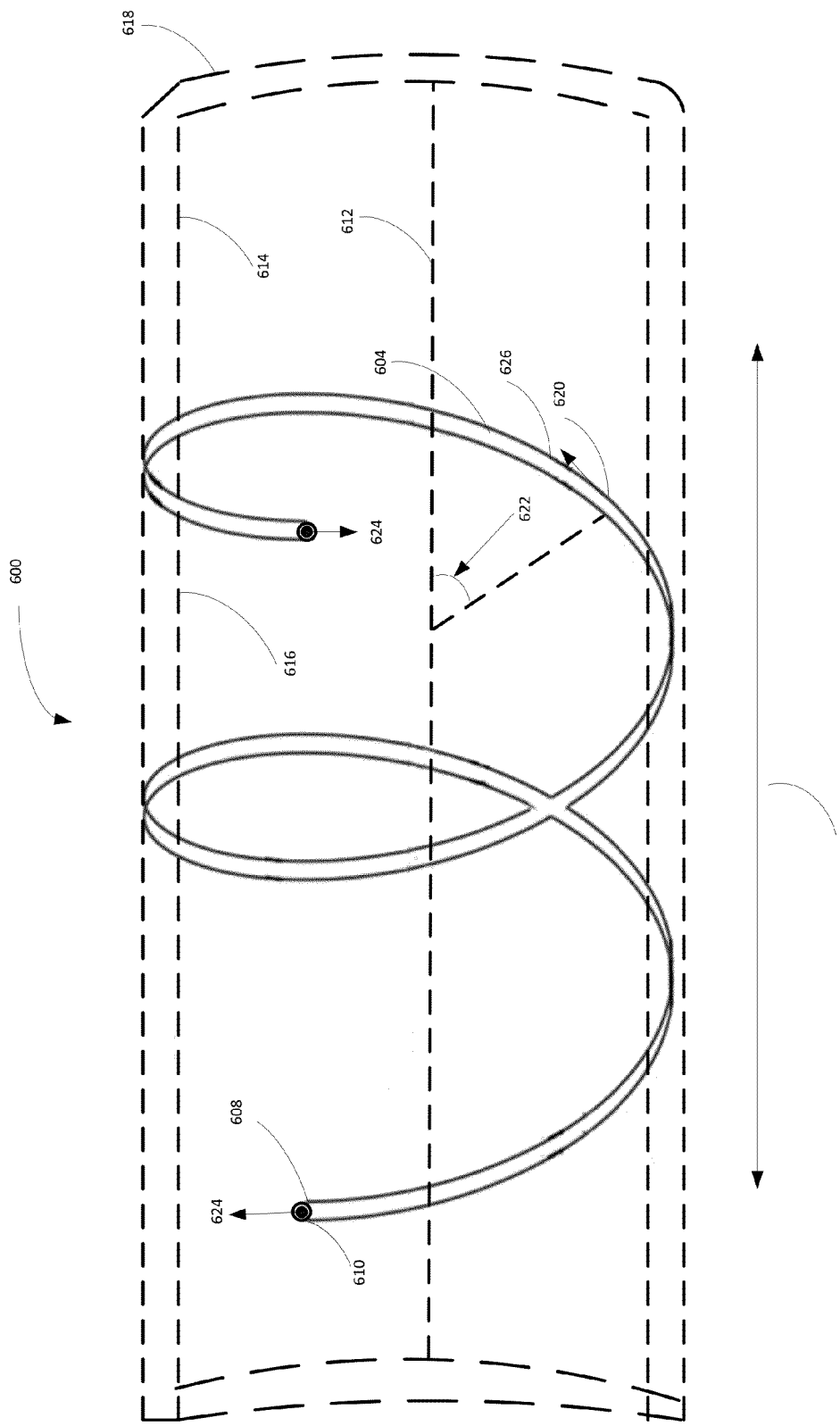
FIG. 6 is a schematic perspective view of one example of a large mode area optical fiber, at least a portion of which is formed in the shape of a helix.

FIG. 6 is a schematic perspective view of one example of a large mode area optical fiber 600 at least a portion 602 of which is formed in the shape of a helix 604. The optical fiber 600 exhibits a refractive index profile distributed over the length 606 of the optical fiber 600 and minimizes bend-induced limitations on the filtering properties distributed along the optical fiber 600. The optical fiber 600 comprises a core region 608 and a cladding region 610 surrounding the core region 608. The portion 602 of the optical fiber 600 may be arranged in the shape of a helix 604 about a helical axis 612. As is known in the art, a helical axis or axis of a helix is an imaginary rectilinear axis around which the helix is wound. To obtain the shape of the helix 604, in one example, the portion 602 of the optical fiber 600 may be wound about an inner member 614 (e.g., a fiber bundle or tube). In another example, the portion 602 of the optical fiber 600 may be bound within an inner surface 616 of an outer member 618 (e.g., a hollow tube) to obtain the helical shape. When the optical fiber 600 is arranged in the shape of a helix 604, the optical fiber 604 may exhibit a property that a tangent line 620 at any point on the optical fiber 600 makes a constant angle 622 with the helical axis 612.

In the portion 602 of the optical fiber 600 arranged in the shape of a helix 604, the core region 608 and cladding region 610 may be configured to support and guide the propagation of signal light in a fundamental transverse mode in the core region 608 in the direction of a longitudinal axis 624. The longitudinal axis 624 may be substantially tangential to a helical bend 626 in the optical fiber 600. In one example, the optical fiber 600 may exhibit a bend-induced gradient in its equivalent index of refraction distributed over the portion 602 of the optical fiber 600 (e.g., the core region 608) formed in the shape of the helix 604. At least a portion 628 of cladding region 610 may exhibit a graded index of refraction opposite the bend-induced gradient of the mode.

Figure 7:
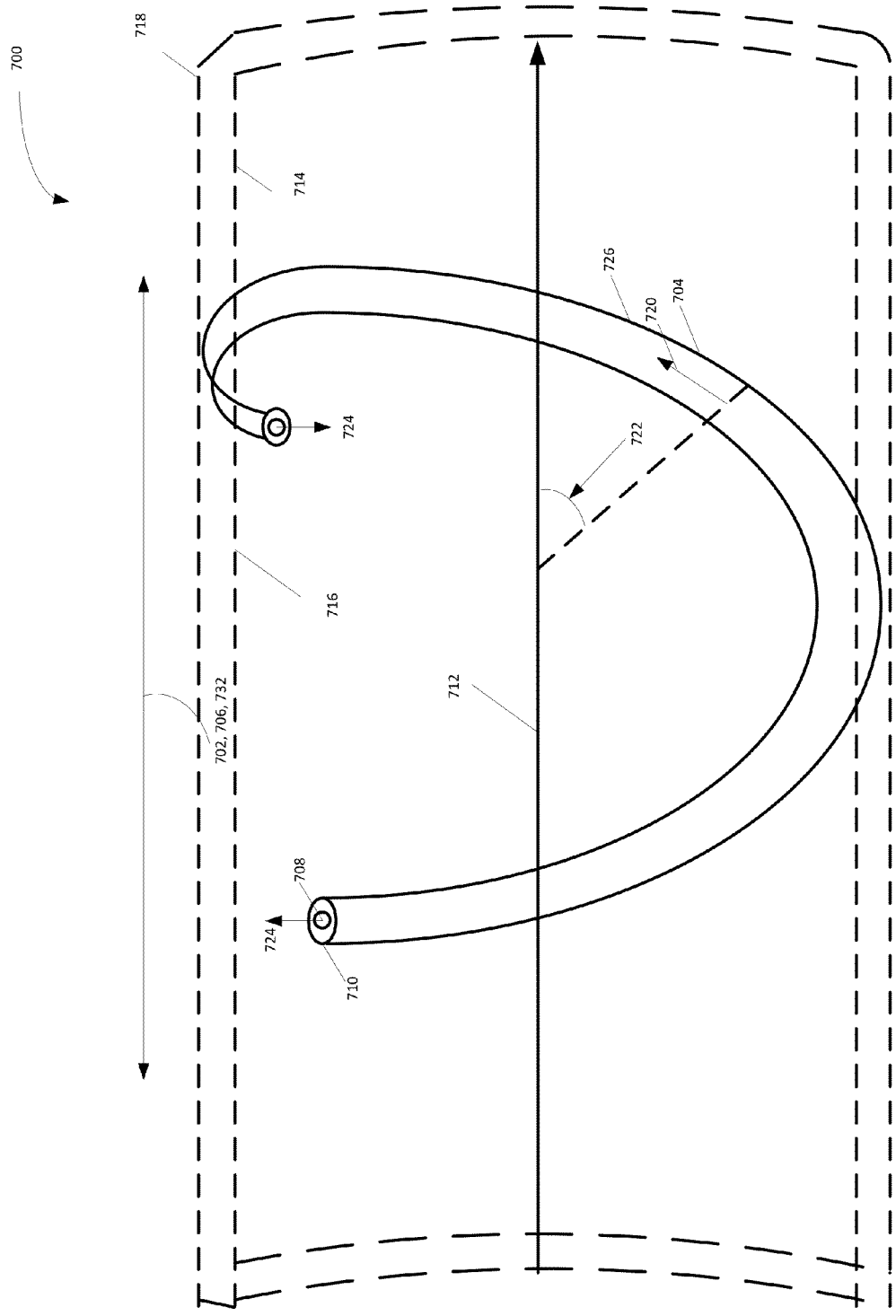
FIG. 7 is a schematic perspective view of another example of a large mode area optical fiber, at least a portion of which is formed in the shape of a helix.

FIG. 7 is a schematic perspective view of another example of a large mode area optical fiber 700 at least a portion 702 of which is formed in the shape of a helix 704. The optical fiber 700 exhibits a refractive index profile distributed over the length 706 of the optical fiber 700 and minimizes bend-induced limitations on the filtering properties distributed along the optical fiber 700. The optical fiber 700 comprises a core region 708 and a cladding region 710 surrounding the core region 708. The portion 702 of the optical fiber 700 may be arranged in the shape of a helix 704 about a helical axis 712. To obtain the shape of the helix 704, in one example, the portion 702 of the optical fiber 700 may be wound about an inner member 714 (e.g., a fiber bundle or tube). In another example, the portion 702 of the optical fiber 700 may be bound within an inner surface 716 of an outer member 718 (e.g., a hollow tube) to obtain the helical shape. When the optical fiber 700 is arranged in the shape of a helix 704, the optical fiber 704 may exhibit a property that a tangent line 720 at any point on the optical fiber 700 makes a constant angle 722 with the helical axis 712.

In the portion 702 of the optical fiber 700 arranged in the shape of a helix 704, the core region 708 and cladding region 710 may be configured to support and guide the propagation of signal light in a fundamental transverse mode in the core region 708 in the direction of a longitudinal axis 724. The longitudinal axis 724 may be substantially tangential to a helical bend 726 in the optical fiber 700. In one example, the optical fiber 700 may exhibit a bend-induced gradient in its equivalent index of refraction distributed over the portion 702 of the optical fiber 700 (e.g., the core region 708) formed in the shape of the helix 704. At least a portion 728 of cladding region 710 may exhibit a graded index of refraction opposite the bend-induced gradient of the mode.

The optical fiber 700 of FIG. 7 differs from the optical fiber 600 of FIG. 6 in that a pitch 730 of the helix 704 formed by the bending of the optical fiber 700 may nearly match the length of a straight line 732 projected by the portion 702 of a core region 708 onto the helical axis 712. In other examples, the pitch may be fractionally smaller or larger than the length of the portion 702 of the optical fiber 700 (e.g., the core region 700) arranged in the form of the helix 704. Accordingly, the core region 708 and cladding region 710 may have a pitch 730 to support and guide the propagation of signal light in the fundamental transverse mode over a distance that is substantially the length of the optical fiber 700. Accordingly, the length of the portion of the core region 708 may substantially match the distance traveled by light in the portion 702 of the core region 708.

In one example, since the portion 602, 702 of the optical fiber 600, 700 is arranged in the form of a helix 604, 704, the core region 608, 708 may have a local radius of curvature that is substantially constant over substantially a total length of the portion 602, 702 of the core region 608, 708. As with any helix, the portion 602, 702 of the core region 608, 708 may be wound in a right-handed direction or left-handed direction about the helical axis 612, 712.

In another example, when the portion 702 of the optical fiber 700 is substantially the length of the optical fiber 700, the core region 708 may have substantially constant radius of curvature over substantially the length of the optical fiber 700. This permits the delivery of light over a distance close to the length of the optical fiber 700.

When at least a portion 602, 702 of the optical fiber 600, 700 has a controllable curvature as a result of cabling the optical fiber 600, 700 to have an approximately helical shape, the transverse position of the portion 602, 702 of the core region 608, 708 of the optical fiber 600, 700 may be expressed as a function of position z along the cable length by equations $$[x,y]=[R_h \cos(\phi_0+2\pi z/\Lambda_h), R_h \sin((\phi_0+2\pi z/\Lambda_h))]$$

Figure 17A:
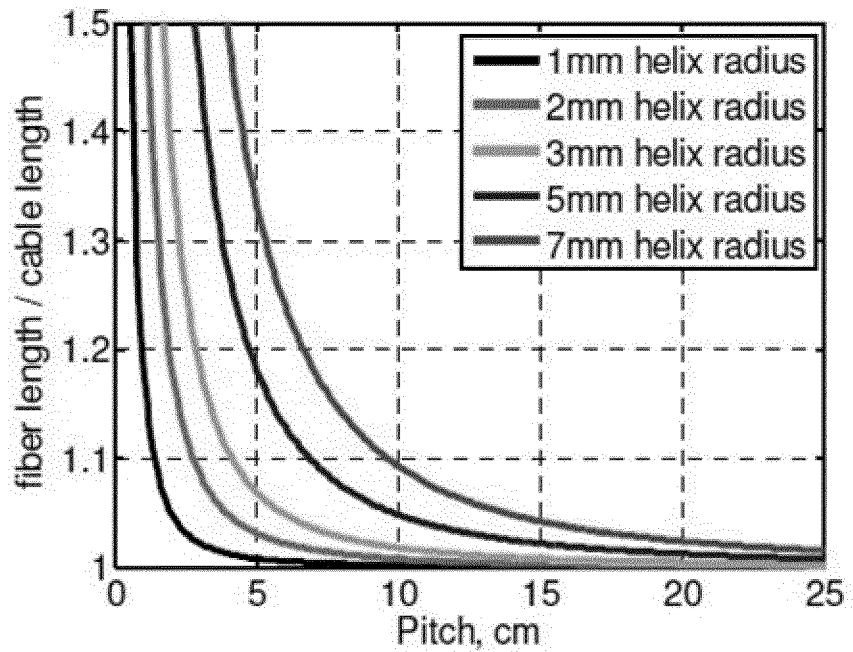
FIGS. 17A and 17B show illustrative curves for ratio of fiber length to cable length (ds/dz) and radius of curvature (Rc), respectively.
Figure 17B:
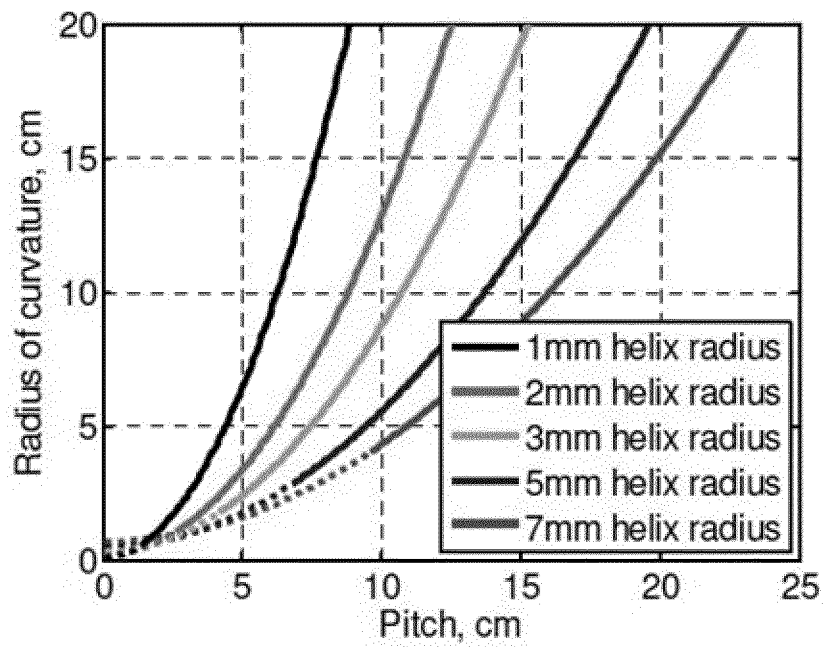

Here $R_h$ is the radius of the helical shape and $\Lambda_h$ is the period of the helix. The radius of curvature is $R_c=((R_h)^2+(\Lambda_h/2\pi)^2)/|R_h|$. The ratio of fiber length to cable length is $ds/dz=[(2\pi R_h/\Lambda_h)^2+1]^{1/2}$. FIGS. 17A and 17B show illustrative curves for ds/dz and Rc, indicating for example that at a helix pitch of 10 cm, radius of curvature can be controlled anywhere from 5 cm to 15 cm by arranging the fiber in an appropriate helical radius. ($R_h$~6 mm gives $R_c$~5 cm; $R_h$~3 mm gives $R_c$~9 cm; $R_h$~2 mm gives $R_c$~13 cm).

In an example, at least the portion 602, 702 of the optical fiber 600, 700 may have a bend induced gradient. In such cases, an equivalent index profile of the portion 602, 702 of the optical fiber 600, 700 may have a slope much smaller in magnitude than the bend induced gradient. In such cases, the bend induced gradient may be at least partially cancelled by a slope in the fabricated index profile.

Figure 8A:
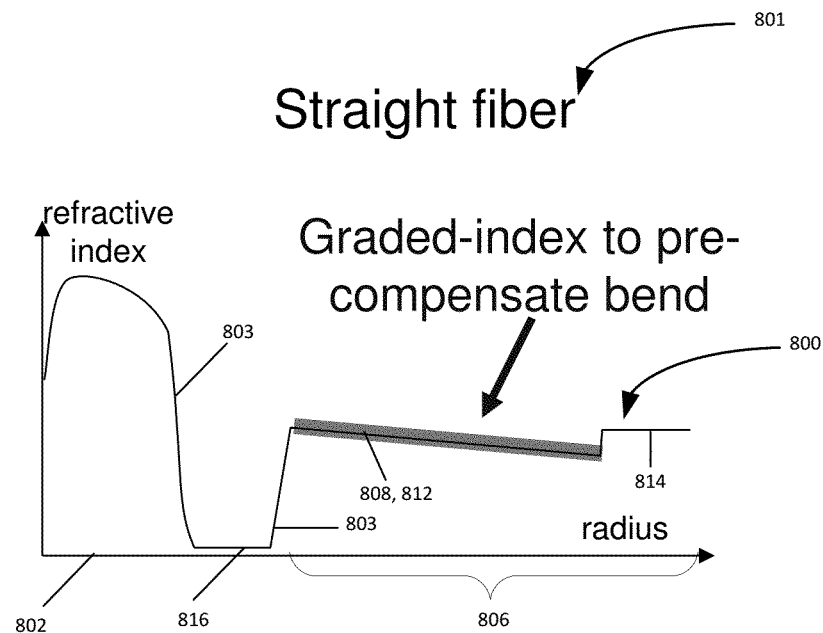
FIG. 8A is a refractive index profile of a pre-compensated optical fiber when the filter fiber is straight.
Figure 8B:
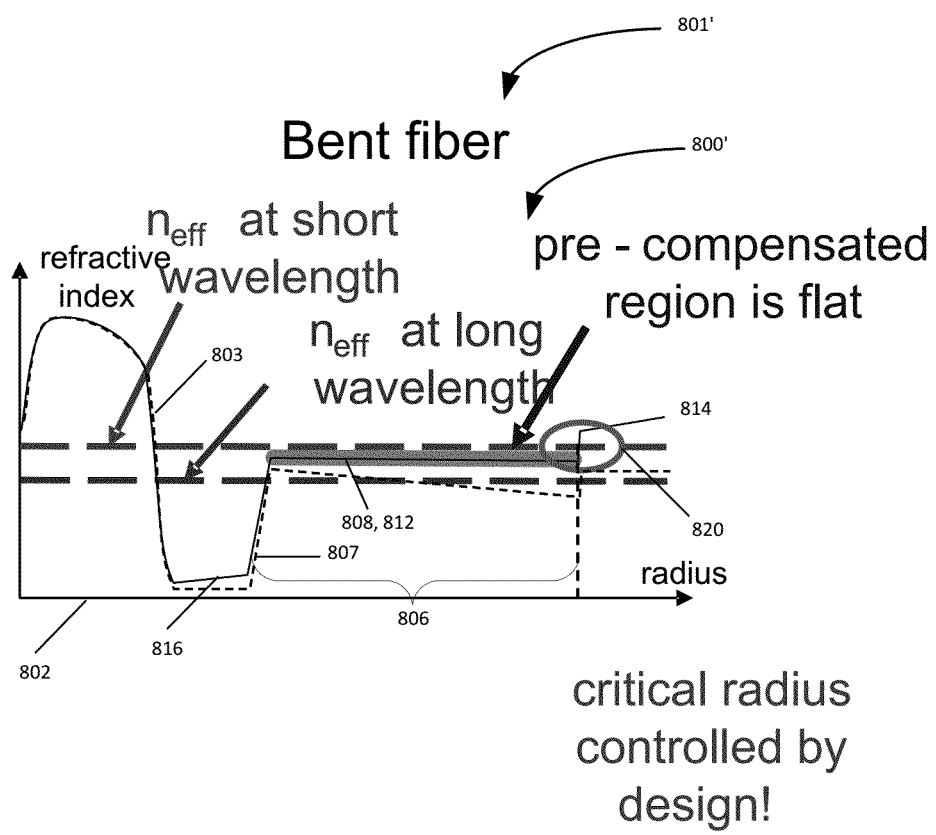
FIG. 8B is an equivalent refractive index profile of a pre-compensated optical fiber when the optical fiber is bent.

FIG. 8A is a refractive index profile 800 of a pre-compensated optical fiber 801 that exhibits a refractive index profile distributed over the length of the optical fiber 801 when the optical fiber 801 is straight. FIG. 8B is a refractive index profile 800' of the pre-compensated optical fiber 801' that exhibits a refractive index profile distributed over the length of the optical fiber 801' when the optical fiber 801 is bent in the form of helix. The pre-compensated optical fiber 801, 801' includes a core region 802 near the fiber center, and a cladding region 806 formed about the core region 802. The cladding region 806 is configured to guide a mode supported by the core region 802. In operation, the cladding region 806 has an index of refraction designed to induce loss in guidance of the mode at particular wavelengths. In an embodiment, at least a portion 808 of the cladding region 806 has a graded-index index of refraction opposite the effective bend-induced gradient.

In one embodiment, the cladding region 806 may comprise an inner cladding region 812 and an outer cladding region 814. A trench region 816 may be formed between the core 802 and the inner cladding region 812. FIG. 8A depicts the inner cladding region 812 having a sub-region 808 with a tilt of index of refraction that pre-compensates an anticipated bend-induced gradient over the entire extent of the inner cladding region 812.

Figure 9A:
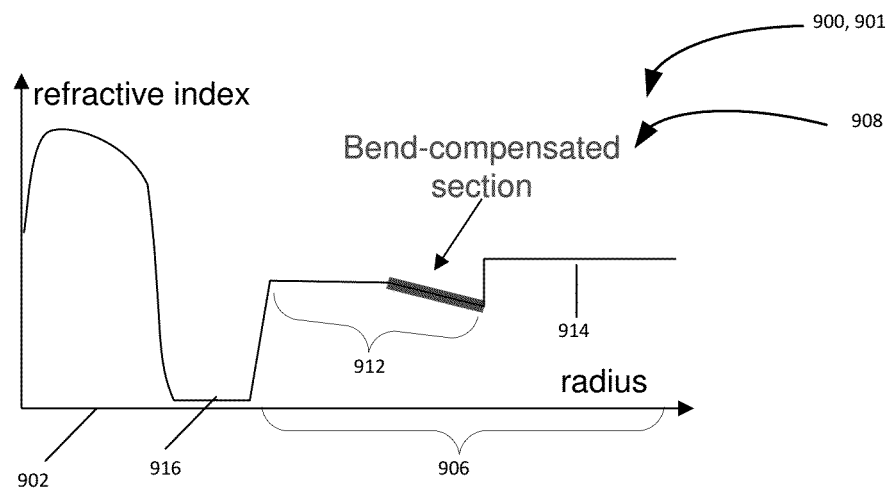
FIGS. 9A and 9B depict additional refractive index profiles of pre-compensated optical fibers when straight and bent, respectively.
Figure 9B:
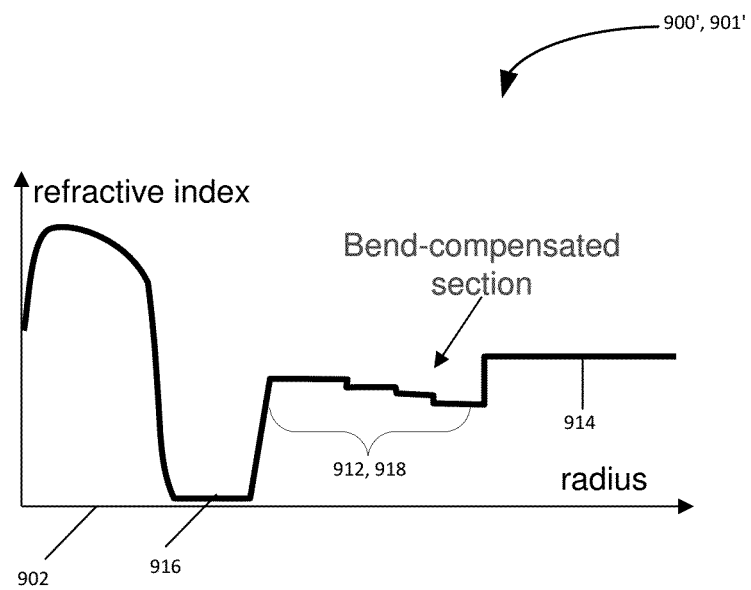

Bend loss is most sensitive to the index profile in a region where the equivalent index of the fiber is close to the effective index of the mode. Thus bend compensation can be effective even if only this portion of the fiber profile has a pre-compensating tilt as shown in FIGS. 9A and 9B. Referring to FIG. 9A, in one embodiment, a pre-compensated tilt in the index of refraction 900 of an optical fiber 901 may extend over only a portion 908 of the inner cladding region 912, preferably including a region at the outside of the inner cladding. FIG. 9A shows a pre-compensated tilt 902 that is substantially continuous. Referring to FIG. 9B, in an alternate embodiment, the optical fiber 901' may be fabricated with a small number of negative-going steps 918. In FIGS. 8A, 9A, 9B, the graded-index portion 808, 908 of the inner cladding region 812, 912 has a gradient opposite that of the bend-induced gradient.

Referring again to FIG. 8A, the refractive index profile 800 exhibits a high index of refraction in the core region 802 near the fiber center, with a rapidly decreasing index in the region 803 that settles in the substantially low index of refraction trench region 816, followed by rapidly increasing index in the region 807. In contrast to the filter fiber of FIG. 7A exhibiting a substantial plateau in a cladding region, the index of refraction of the inner cladding region 812 of FIG. 8A exhibits a negative-going tilt or grading to pre-compensate for an anticipated bend in the optical fiber 801.

With no perturbations, the pre-compensated optical fiber 801 of FIG. 8A may be configured to rigorously guide a mode of a low wavelength of signal light with no loss and to exhibit high loss at large wavelengths. When subjected to bends as illustrated in FIG. 8B, the optical fiber 801 does not become leaky, i.e., the optical fiber equivalent index profile 800' exhibits a substantially flat equivalent index of refraction with increasing radius up to a critical radius 820 at an interface with the outer cladding region 814. Selectivity is thereby maintained in at least a portion of the inner cladding region 812. The critical radius 820 for short-wavelength leakage is now determined by the design.

In the embodiment depicted in FIG. 8A, the pre-compensated portion 808 of the optical fiber 801 has an index gradient $$dn/dr=-n_{substrate}/R_{eq},$$

where $n_{substrate}$ is the nominal index of the optical fiber 801 (e.g., with silica index=1.45), and $R_{eq}$ is the equivalent bend radius in the Marcuse model. As shown in FIG. 8B, when the optical fiber 801 is bent in the form of a helix, optical properties are determined by the equivalent index, which has a substantially flat region 822 and is therefore more conducive to large effective mode area.

In one embodiment, $R_{eq}$ may simply be the radius of curvature Rc of the helically shaped optical fiber 801. In another embodiment, the radius of curvature Rc may be adjusted for strain and other effects to provide an equivalent radius (e.g., $R_{eq}=R_c/0.8$). Further, the radius of curvature in a real fiber is never perfectly constant, and portions of the optical fiber 801 with smaller radius of curvature may contribute most of the loss, so $R_{eq}$ may depend on the detailed fiber handling and layout in a more complicated way, and may be determined empirically. In another embodiment, an optical fiber may be designed for an anticipated arrangement and utilized in a different arrangement. Pre-compensation may provide significant benefit within a range of arrangements, although a large mismatch between the anticipated and actual curvature may result in performance degradation (e.g. high bend loss, insufficient filtering, multi-modedness, etc.).

In another example, the material index of refraction of the optical fiber 801, 901 as a function of radial position r in the pre-compensated portion of the inner cladding region 812, 912 approximately equals the mode effective index $n_{eff}$ minus a compensation term, or:

$$n_{portion} \sim n_{eff}(1-r/R_{eq})$$

where Req is less than 50 cm and where the extent of the pre-compensated portion is large, illustratively greater than 20 microns.

The index of refraction of the core region 802, the radius of the core region 802, and index of refraction of the trench region 816 together substantially determine the effective area $A_{eff}$ and the effective refractive index $n_{eff}$ of a fundamental mode at a signal wavelength (where low loss is desirable) and at a noise wavelength (where large suppression is desirable). The equivalent index of the cladding region 806 (including a compensating tilt and bend perturbation) relative to the fundamental mode effective index determines the loss at the signal and noise wavelengths, respectively. In a preferred embodiment, the equivalent index of the cladding region 806 should fall below the signal-wavelength index $n_{eff}(\lambda_{signal})$ but also fall above the noise index $n_{eff}(\lambda_{noise})$ over the largest possible portion of the cladding region 806. As shown in FIG. 8B, this is best achieved when the bend perturbation is pre-compensated (and can be achieved to some extent even if the bend perturbation is imperfectly compensated). In some preferred embodiments, the pre-compensated optical fiber 801 includes a cladding region 806 with large radial extent that has a significant negative index gradient.

Figure 10:
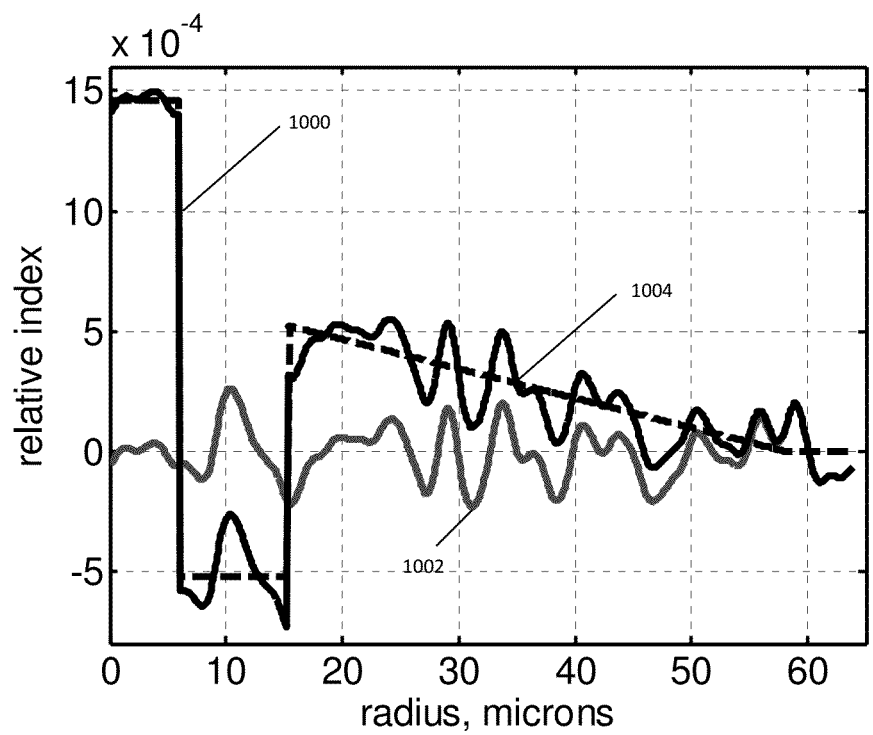
FIG. 10 shows an illustrative target index profile plotted along with irregularities in the index profile and a resulting summed total index profile.

An actual fabricated profile may have significant irregularities as would be appreciated by one of ordinary skill in the art having the benefit of this disclosure. FIG. 10 shows an illustrative target index profile 1000 plotted along with irregularities in the index profile 1002 and a resulting summed total index profile 1004. The gradient of the total index profile 1004 deviates significantly from the gradient of the target index profile 1000, yet calculated performance of the summed total index profile 1004 is very good. It will be appreciated by one of ordinary skill in the art having the benefit of this disclosure that the trend of the gradient or a smoothed gradient matches the target gradient over a large cladding region.

In an example, as shown in FIG. 8, the gradient of the target index profile may have a pre-compensated region with radial extent >40 microns.

Figure 11C:
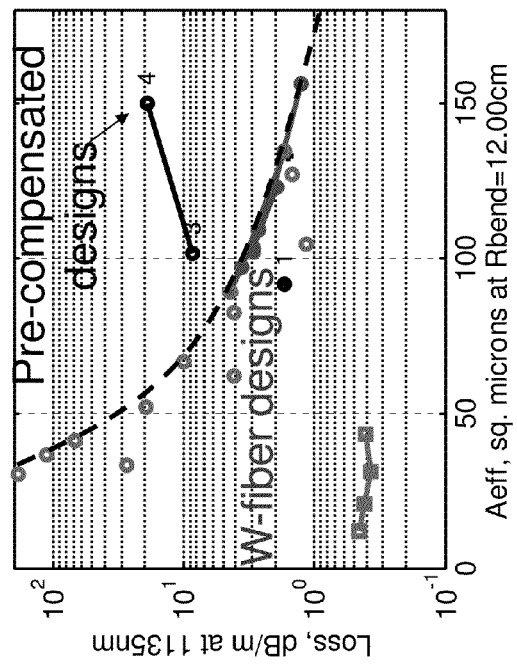
FIG. 11C is a plot of filtering loss versus effective area $A_{eff}$ of two proposed designs and several conventional bent optical fibers, each having a bend radius of about 12 cm.
Figure 11B:
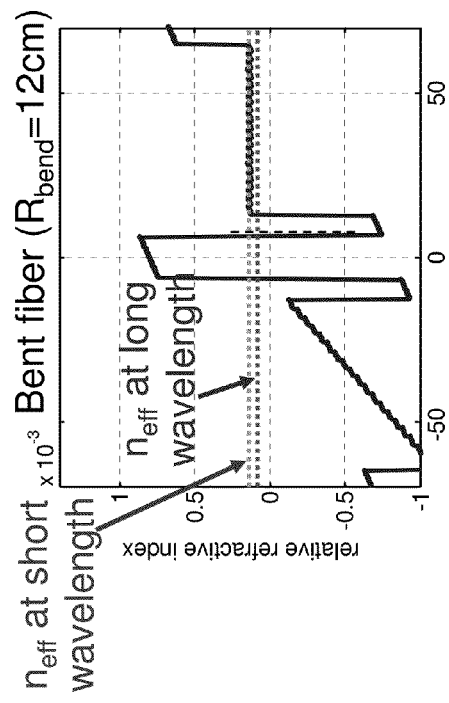
FIGS. 11A and 11B depict straight and bent profiles, respectively, of relative refractive index versus distance from the center of an optical fiber designed to be pre-compensated.
Figure 11A:
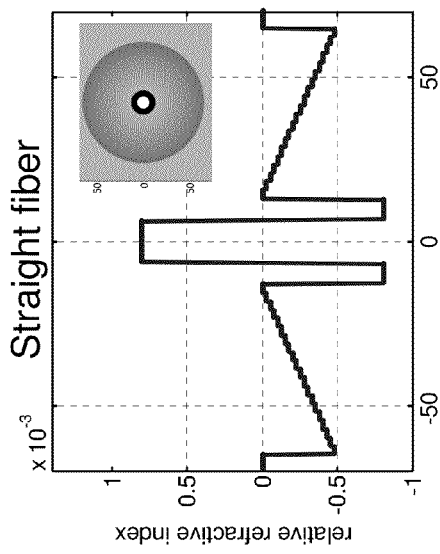

FIGS. 11A and 11B depict straight and bent profiles, respectively, of relative refractive index versus distance from the center of an optical fiber designed to be pre-compensated. In the example shown, $A_{eff}$ is selected to be about 150 μm² with a greater than 10× more selectivity than conventional W-fibers, as shown in FIG. 11C. The effective index difference is selected to be about $n_{eff}(1060\ nm)-n_{eff}(1135\ nm)\sim 0.6\times 10^{-4}$. The fiber is selected to be radially symmetrical. The example of FIGS. 11A-11C illustrates that different signal loss thresholds may be employed, e.g., 0.1 dB/m. The threshold can ultimately be chosen to suit the anticipated fiber length and acceptable signal loss.

Similarly, the degree of suppression of the noise wavelength depends on the application and system parameters. Typically fiber length for gain fibers may be a few meters (e.g. for core-pumped Yb fibers with strong pump absorption) or may be many tens of meters (e.g. for cladding-pumped Er-doped fibers). For non-gain-doped fibers, length can vary over a much wider range, including lengths much shorter than 1 m. The total amount of noise loss (equal to the noise loss rate times the length) should be at least a few dB, but preferably greater than 20 dB. For example, the noise loss rate is thus preferably greater than 10 dB/m for short fiber lengths (e.g. 2 m), in order to achieve a product of 20 dB. For longer lengths (e.g. 20 m), 1 dB/m loss is sufficient to induce large total loss. For gain fibers, the suitable rate of signal loss and noise loss can be specified relative to the pump absorption (both specified in dB/m): noise loss should be at least 20% of pump absorption, and preferably at least 100% of pump absorption. Signal loss should be less than 5% of pump absorption, and preferably less than 1% of pump absorption.

The current examples are intended primarily for effective areas too large to achieve by more conventional means. Accordingly, they are primarily intended for effective areas greater than 50 sq. microns, and especially greater than 100 sq. microns.

Figure 12A:
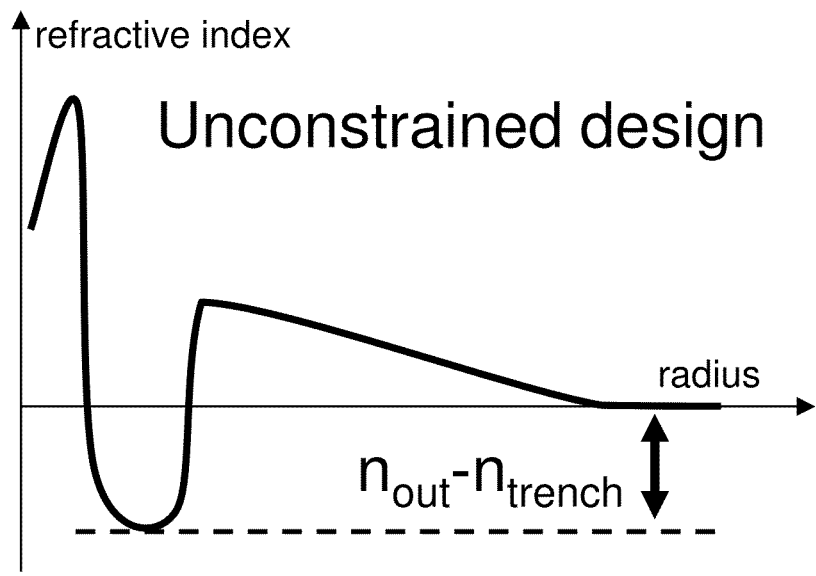
FIG. 12A illustrates one example of an unconstrained bend-compensated index profile.
Figure 12B:
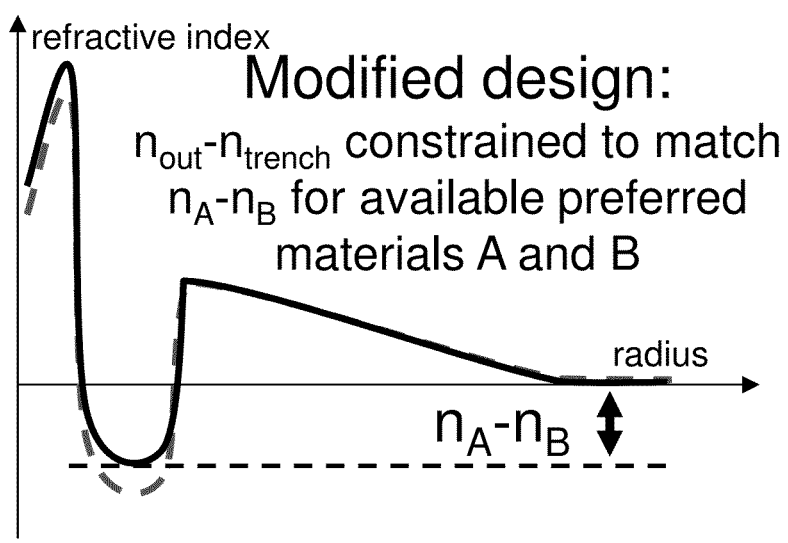
FIG. 12B shows a bend-compensated profile in which $n_{out}$-$n_{trench}$ is constrained to match $n_A$-$n_B$ for available preferred materials A and B.

A very precisely defined index profile is desirable to achieve best performance. Preferred fabrication methods can improve index profile precision, make fabrication easier, or reduce cost. In an example, bend-compensated filter fibers may be fabricated by conventional deposition (e.g. MCVD) or by "microstructured" fabrication methods (stacking). Such considerations and manufacturing methods may impose constraints on a design. FIG. 12A illustrates one example of an unconstrained bend-compensated index profile, while FIG. 12B shows a bend-compensated profile in which $n_{out}-n_{trench}$ is constrained to match $n_A-n_B$ for available preferred materials A and B. Other parameters (e.g., trench width) may be adjusted to satisfy the design requirements with this constraint.

In another example, the outer cladding may be formed in part from pure silica or a commercially available glass tube. Preferably, tubes with an index of pure silica or slightly above ($0$-$5\ e^{-4}$) may be used, since these have low cost and highly predictable index. Other regions may be formed of pure silica or commercially available tubes. For example, the trench region may be pure silica.

The index difference between two regions may be constrained by available preferred materials. For example, two regions may be formed of identical materials, and have zero index difference, e.g., $n_{out}-n_{trench}\approx 0$. In another example, the well-known fact that the refractive index of nominally pure and undoped silica can vary depending on fabrication conditions and method due to impurities and defects can be exploited by using one tube of Heraeus F300 glass to form part of the outer cladding, while the trench may be formed of undoped silica derived from another source, such as vapor phase deposition. This can result in an index difference, e.g., $n_{out}-n_{trench}\approx 5\times 10^{-4}$.

Figure 13:
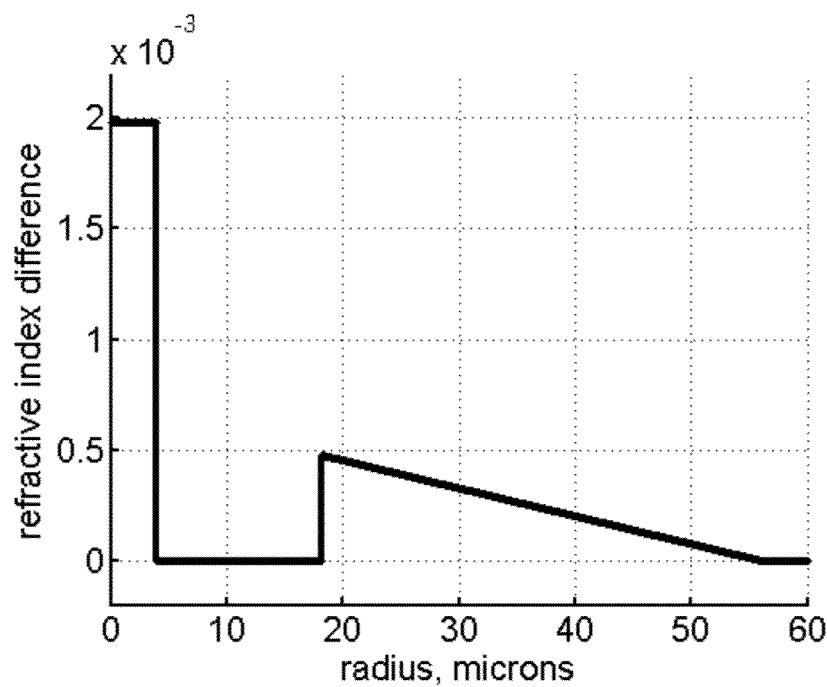
FIG. 13 shows a pre-compensated optical fiber designed with an index constraint, where the trench index equals the outer cladding index.

In another example, a pre-compensated optical fiber may be designed with an index constraint as shown in FIG. 13, where the trench index equals the outer cladding index.

In an example, as shown in FIG. 13, the gradient of the target index profile may have a pre-compensated region with radial extent >30 microns.

Figure 14A:
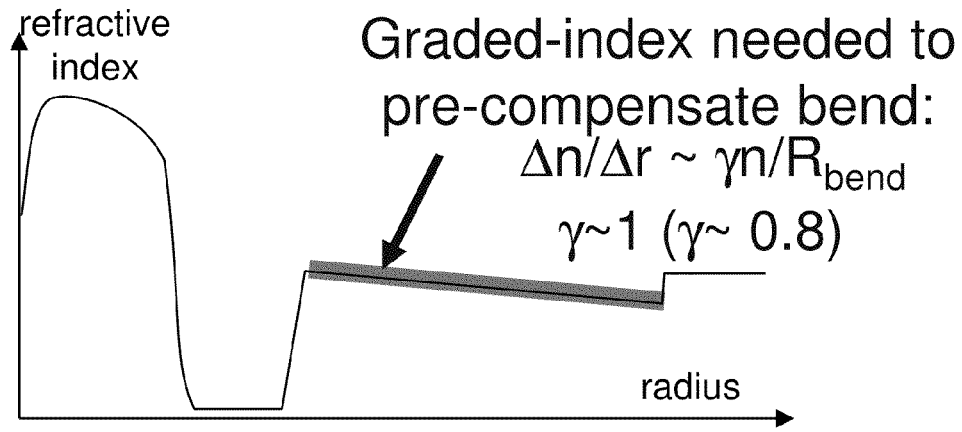
FIGS. 14A and 14B illustrate a rough technique for designing a bend-compensated profile having an assumed linear gradient in the inner cladding region of $\gamma n/R_{bend}$.
Figure 14B:
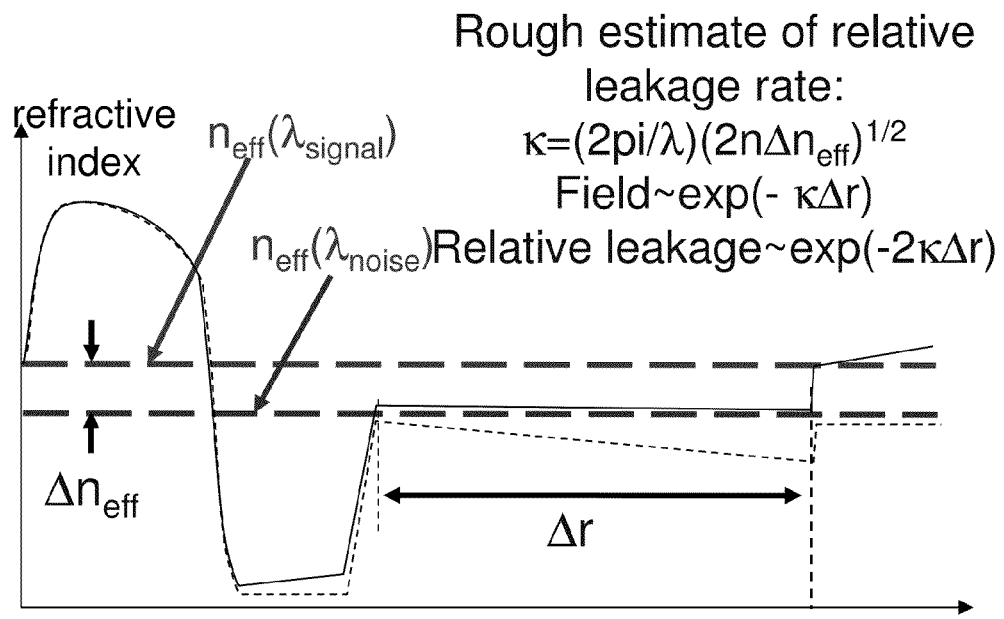

FIGS. 14A and 14B illustrate a rough technique for designing a bend-compensated profile having an assumed linear gradient in the inner cladding region of $\gamma n/R_{bend}$. The graded-index needed to pre-compensate a bend in the inner cladding region may be selected such that $\Delta n/\Delta r \sim \gamma n/R_{bend}$ and $\gamma \sim 1$ ($\gamma \sim 0.8$). In one example, $R_{bend}$=12 cm, $\gamma \sim 0.8$, gradient$\sim$0.1/cm$\sim 10^{-5}$ μm. A simple construction provides an estimate of how much relative leakage can be achieved between two wavelengths ($\lambda_{signal}$ and $\lambda_{noise}$). As shown in FIG. 14B, a rough estimate of relative leakage rate is:

$$\kappa = (2\pi/\lambda)(2n\Delta n_{\mathit{eff}})^{1/2}$$

$$\text{Field} \sim \exp(-\Delta \kappa r)$$

$$\text{Relative leakage} \sim \exp(-2(2\pi/\lambda)(2n\Delta n_{\mathit{eff}})^{1/2}\Delta r)$$

$$\text{Relative leakage} \sim \exp(-2\kappa \Delta r)$$

For example, if $\Delta r \sim 50$ microns and $\Delta n_{\mathit{eff}} \sim 0.6 \times 10^{-4}$, then the relative leakage is $\sim 4 \times 10^{-4}$.

Referring again to FIGS. 6 and 7, in an example, the optical fiber 600, 700 may be employed along with means for arranging the optical fiber 600, 700 so that its local curvature results in favorable filtering, but also allows delivery of light over a distance close to the length of the optical fiber 600, 700. In an example, the optical fiber 600, 700 may or may not have a bend-compensated region, or may be of any of several other types, including solid bandgap fiber, fibers with resonant coupling, fibers with "w" profiles, or other known optical fibers. The means of arranging the optical fiber 600, 700 may be adjusted to compensate for the manufacturing variations of the optical fiber 600, 700. In another example, one may combine previously known means for arranging the optical fiber 600, 700 (e.g. existing cables used in an application of interest) and produce an optical fiber 600, 700 so that it achieves favorable filtering when the radius of curvature falls in the range produced by the known arrangement. The optical fiber 600, 700 may include an adjustment made during production, for example, the optical fiber 600, 700 may include a stress correction, a layer of adjusted thickness, or UV-induced index change made to achieve desirable filtering, while allowing for variations in the preform fabrication process. The radius of curvature may often have statistical variations, and these statistics may be considered when determining the filtering properties.

Raman Suppression: Effective Area and Loss Selectivity

The performance tradeoff between mode area and filter selectivity is shown in FIG. 15. Simulated results are shown for optimized designs of the conventional w-fiber type 1502 for the illustrative case where signal loss is constrained to <0.02 dB/m. Selectivity of filtering is defined by the ratio of dB/m losses for the signal wavelength 1060 nm and noise wavelength 1135 nm, and the plot confirms the strict tradeoff depicted schematically in FIG. 15. By comparison, bend compensated designs 1504 can greatly exceed the performance tradeoff, simultaneously achieving highly selective suppression, large mode area, and compatibility with conventional fabrication.

A simple model of the improved system performance this would enable is plotted in FIG. 16. This plots the power-length product at which the net Raman gain reaches 20 dB, according to the simple equation:

$$\exp(g_R P L/A_{\mathit{eff}}) = \exp([(\ln 10/10)(20 + \text{suppression})])$$

Here, the SRS suppression is taken to be simply the (Noise Loss/Signal loss) factor from the fiber simulations times the acceptable signal loss (which is a system level design parameter). For simplicity, it may be assumed that relative selectivity ratio is nearly independent of the specific 0.02 dB/m signal loss assumed in the simulations. The conventional design performance is plotted 1602 assuming several different values of acceptable signal-wavelength loss, from 0.05 dB to 0.4 dB, and shows that the conventional fiber limitation prevents highly desirable regime of kW power propagating with low loss over distances significantly greater than 10 m. In contrast, the bend-compensated fibers 1502 (circles) enable dramatically improved performance: suggesting that even for very small 0.05 dB signal loss, and moderate core size, one could approach 2 kW power delivered over 20 m with a reasonable bending requirement that the local fiber radius of curvature be maintained at 10 cm (although imperfections and un-modeled effects may reduce actual performance somewhat). Such a bend requirement can be met by proper cabling of the optical fiber 600, 700.

A method of manufacturing an optical fiber 600, 700 may be provided. The optical fiber 600, 700 may have a core region 608, 708 having a longitudinal axis 624, 724. A cladding region 610, 710 may be formed surrounding the core region 608, 708. At least a portion 602, 702 of the optical fiber 600, 700 may be bent to have a substantially helical shape 604, 704 about a helical axis 612, 712. The core region 608, 708 and cladding region 610, 710 may be configured to support and guide the propagation of signal light in a fundamental transverse mode in the core region 608, 708 in the direction of the longitudinal axis 624, 724. The optical fiber 600, 700 may have a bend-induced gradient in its equivalent index of refraction over the portion of the core region 608, 708. At least a portion of cladding region 610, 710 may have a graded index of refraction opposite the bend-induced gradient of the mode.

In an example, the optical fiber 600, 700 may be manufactured to compensate the portion of the core region for manufacturing variations. Compensating for manufacturing variations may comprise at least one of providing a stress correction in the optical fiber 600, 700, providing a layer of adjusted thickness in the optical fiber 600, 700, providing an ultraviolet (UV)-induced index change in the optical fiber 600, 700, or adjusting for statistical variations in a radius of curvature of the optical fiber 600, 700.

The present disclosure has thus far described examples where management of bends in a fiber along with bend compensation of an index profile of the fiber may be used to achieve selective suppression of one wavelength while another wavelength maintains low loss. It will be recognized that bend compensation of the index profile can offer benefits other than wavelength filtering, such as the selective suppression of a transverse mode, and that this mode selectivity is closely analogous to the wavelength selectivity discussed above.

Use of bend compensated index profiles to achieve improved suppression of unwanted transverse modes has been discussed, for example, in U.S. Pat. No. 7,920,767 B2 ("the '767 patent" and U. S. Patent Application publication No. US 2013/0251324 A1 ("the '324 publication). In addition, bend compensation in the '767 patent, the '324 publication, and asymmetrical bend compensation discussed in U.S. Pat. No. 7,764,854 B2 ("the '854 patent), provides benefits to mode area and interaction of signal light with a gain medium.

The disclosures of the '767 patent, the '324 publication, and the '854 patent are incorporated herein by reference in their entirety.

It is then clear that the examples proposed hereinabove, of using techniques for managing bends along with bend compensation of the index profile, can be applied more generally than in the suppression of undesirable wavelengths. A person skilled in the art will recognize that bend-management methods (such as cabling) may be employed to produce a desired fiber curvature, along with a fiber index profile containing a bend-compensated portion, such that the bend-induced gradient is substantially cancelled. In this way, the benefits of bend-compensation described previously for various coiled fibers can be obtained for fibers that are not arranged on a coil (for example, arranged in a telecommunications cable or arranged in a delivery-fiber cable). Bend-management techniques described hereinabove (e.g. helical arrangement) and others known in the art can be used to control the statistics of the local fiber curvature, and may be used to control the orientation of the curvature with respect to any fiber asymmetries (for example, if the bend compensation comprises an asymmetrical index gradient).

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An optical fiber, comprising:
   a core region having a longitudinal axis, a portion of the core region having a substantially helical shape about a helical axis, the longitudinal axis substantially tangential to a helical bend in the optical fiber; and
   a cladding region surrounding the core region, the core region and cladding region configured to support and guide the propagation of signal light in a fundamental transverse mode in the core region in the direction of the longitudinal axis, the fiber having a bend-induced gradient in its equivalent index of refraction over the portion of the core region, at least a portion of cladding region having a graded index of refraction opposite the bend-induced gradient of the mode,
   wherein the cladding region comprises an inner cladding region; and
   wherein the material index of refraction of the fiber as a function of radial position in a pre-compensated portion of the inner cladding region equals the mode effective index minus a compensation term.

2. The optical fiber of claim 1, wherein the length of the portion of the core region substantially matches the length of a straight line projected by the portion of the core region onto the helical axis.

3. The optical fiber of claim 1, wherein the length of the portion of the core region substantially matches the distance traveled by light in the portion of the core region.

4. The optical fiber of claim 1, wherein the core region has a local radius of curvature that is substantially constant over substantially a total length of the core region.

5. The optical fiber of claim 4, wherein the portion of the core region is wound in a right-handed direction or left-handed direction about the helical axis.

6. The optical fiber of claim 1, wherein the core region has a substantially constant radius of curvature over substantially the length of the optical fiber.

7. The optical fiber of claim 1, wherein the core region and cladding region have a pitch to support and guide the propagation of signal light in the fundamental transverse mode over a distance that is substantially the length of the optical fiber.

8. The optical fiber of claim 1, wherein the cladding region is configured to have a substantially flat equivalent index in response to a bend of the optical fiber.

9. The optical fiber of claim 1, wherein the slope of the graded index of refraction is substantially negative.

10. The optical fiber of claim 9, wherein the slope of the graded index of refraction is substantially constant.

11. The optical fiber of claim 9, wherein the slope of the graded index of refraction comprises a predetermined number of steps.

12. The optical fiber of claim 1, wherein the cladding region further comprises an outer cladding region and the optical fiber further comprises a trench region formed between the core region and the inner cladding region.

13. The optical fiber of claim 12, wherein the portion of cladding region having a graded index of refraction opposite the bend-induced gradient extends over at least a portion of the inner cladding region.

14. The optical fiber of claim 13, wherein the portion of cladding having a graded index of refraction opposite the bend-induced gradient extends to a boundary dividing the inner cladding region and the outer cladding region.

15. The optical fiber of claim 13, wherein the outer cladding region and the trench region have the same index of refraction.

16. The optical fiber of claim 1, wherein a cross-section of the core region is one of circular, annular, elliptical, polygonal, or other more complex shapes.

17. The optical fiber of claim 1, wherein the optical fiber is one of a solid band-gap fiber, a fiber with resonant coupling, or a fiber with a w-shaped profile.

18. A method, comprising:
    bending at least a portion of an optical fiber to have a substantially helical shape about a helical axis, the optical fiber having a core region having a longitudinal axis and a cladding region surrounding the core region, the longitudinal axis substantially tangential to a helical bend in the optical fiber, the core region and cladding region configured to support and guide the propagation of signal light in a fundamental transverse mode in the core region in the direction of the longitudinal axis, the fiber having a bend-induced gradient in its equivalent index of refraction over the portion of the core region, at least a portion of cladding region having a graded index of refraction opposite the bend-induced gradient of the mode,
    wherein the cladding region comprises an inner cladding region; and
    wherein the material index of refraction of the fiber as a function of radial position in a pre-compensated portion of the inner cladding region equals the mode effective index minus a compensation term.

19. The method of claim 18, further comprising compensating the portion of the core region for manufacturing variations.

20. The method of claim 18, wherein compensating for manufacturing variations comprises at least one of providing a stress correction in the optical fiber, providing a layer of adjusted thickness in the optical fiber, providing an ultraviolet (UV)-induced index change in the optical fiber, or adjusting for statistical variations in a radius of curvature of the optical fiber.

* * * * *